US012201067B2

United States Patent
Yeh

(10) Patent No.: US 12,201,067 B2
(45) Date of Patent: Jan. 21, 2025

(54) PASTURE GRASS SUBSTRATE

(71) Applicant: LOHAS BIOTECH DEVELOPMENT CORP., Taipei (TW)

(72) Inventor: Shang-Kaung Yeh, Taipei (TW)

(73) Assignee: LOHAS BIOTECH Development Corp., Taipei (TW)

( * ) Notice: Subject to any disclaimer, the term of this patent is extended or adjusted under 35 U.S.C. 154(b) by 1 day.

(21) Appl. No.: 17/730,068

(22) Filed: Apr. 26, 2022

(65) Prior Publication Data

US 2023/0276748 A1 Sep. 7, 2023

(30) Foreign Application Priority Data

Mar. 2, 2022 (TW) .................................. 111107632

(51) Int. Cl.
| | | |
|---|---|---|
| *A01G 18/20* | (2018.01) | |
| *A01G 18/50* | (2018.01) | |
| *A01G 24/25* | (2018.01) | |
| *C05F 5/00* | (2006.01) | |
| *C05F 17/60* | (2020.01) | |
| *C05F 17/80* | (2020.01) | |

(52) U.S. Cl.
CPC ............ *A01G 18/20* (2018.02); *A01G 18/50* (2018.02); *A01G 24/25* (2018.02); *C05F 5/002* (2013.01); *C05F 17/60* (2020.01); *C05F 17/80* (2020.01)

(58) Field of Classification Search
CPC ........ A01G 18/20; A01G 24/25; A01G 18/50; A01G 18/10; A01G 18/40; A01G 18/66; A01G 18/70; C05F 17/60; C05F 5/002
See application file for complete search history.

(56) References Cited

U.S. PATENT DOCUMENTS

| | | | | |
|---|---|---|---|---|
| 3,828,470 | A * | 8/1974 | Stoller .................... | A01G 18/50 47/1.1 |
| 3,942,969 | A * | 3/1976 | Carroll, Jr. .............. | C05F 11/00 47/1.1 |
| 4,127,965 | A * | 12/1978 | Mee ........................ | A01G 18/70 47/1.1 |
| 4,833,820 | A * | 5/1989 | Nishio ................... | A01G 18/64 47/1.1 |

(Continued)

FOREIGN PATENT DOCUMENTS

| | | | | | |
|---|---|---|---|---|---|
| CN | 1222827 | A | * | 7/1999 | ............... A01G 1/04 |
| CN | 107129338 | A | * | 9/2017 | |

(Continued)

OTHER PUBLICATIONS

Translation: a Black Fungus High-yielding and Bag-material Cultivation Method. Cheng (Year: 2019).*

(Continued)

*Primary Examiner* — David J Parsley
*Assistant Examiner* — Kari A Bradberry
(74) *Attorney, Agent, or Firm* — Winston Hsu

(57) ABSTRACT

A pasture grass substrate includes a dry material and water. The dry material includes pasture grasses, corncobs and rice brans. The weight ratio of the pasture grasses in the dry material is from 55% to 75%. The weight ratio of the corncobs in the dry material is from 20% to 30%. The weight ratio of the rice brans in the dry material is from 5% to 15%. The incubating methods of mushrooms are also disclosed.

3 Claims, 4 Drawing Sheets

(56) References Cited

U.S. PATENT DOCUMENTS

| | | | | | |
|---|---|---|---|---|---|
| 5,123,203 | A | * | 6/1992 | Hiromoto | ............ A01G 18/20 |
| | | | | | 435/256.8 |
| 2007/0294939 | A1 | * | 12/2007 | Spear | .................... A01G 18/20 |
| | | | | | 47/1.1 |

FOREIGN PATENT DOCUMENTS

| | | | | | |
|---|---|---|---|---|---|
| CN | 108243837 | A | * | 7/2018 | |
| CN | 109511461 | A | * | 3/2019 | ............ A01G 18/00 |
| KR | 20060036349 | A | * | 4/2006 | |
| KR | 20110004760 | A | * | 1/2011 | |
| TW | 200800001 | A | | 1/2008 | |
| TW | 202135647 | A | | 10/2021 | |
| WO | WO-9313647 | A1 | * | 7/1993 | ............... A01G 1/04 |

OTHER PUBLICATIONS

Original & Translation—TW1284502 B (Year: 2007).*
Original & Translation—CN 101139229 (Year: 2008).*
Original & translation—CN 108739062 (Year: 2018).*
Original & Translation KR 20060021268 (Year: 2006).*

* cited by examiner

PASTURE GRASS SUBSTRATE

CROSS REFERENCE TO RELATED APPLICATIONS

This Non-provisional application claims priority under 35 U.S.C. § 119(a) on Patent Application No(s). 111107632 filed in Taiwan, Republic of China on Mar. 2, 2022, the entire contents of which are hereby incorporated by reference.

BACKGROUND

Technology Field

This disclosure relates to a culture substrate for culturing mushrooms. In particular, this disclosure relates to a culture substrate containing a large amount of pasture, a pasture grass plastic bag containing the pasture grass substrate, and an incubating method for incubating mushrooms with the pasture grass substrate.

Description of Related Art

In recent years, the global mushroom market has numerously flourished. Generally speaking, mushrooms can be divided into edible mushrooms and medicinal mushrooms, and they are rich in various nutrients and can even be used as medicine, so the demands for mushrooms are increasing day by day. At present, most mushroom farmers mainly use sawdust as the culture substrate for mushroom cultivation, so a large amount of wood has been used to supply mushroom cultivation with the increasing demand for mushrooms. However, due to the limited area of forest land, the sawdust are not easy to be obtained. In addition, it will cause damage to the natural ecology, and it will increase the cost of cultivation (if the raw materials are relied on imports).

Furthermore, the culture substrate made of sawdust cannot be recycled, and a large amount of waste will be generated after mushroom cultivation. This will cause damage to the natural environment.

In addition, the nutrients required by various mushrooms are slightly different, and thus the required contents in the culture substrates are also slightly different. In practice, the contents in the culture substrates can not only affect the yield of mushrooms, but also affect the quality thereof.

Therefore, it is desired to provide a culture substrate that contains without sawdust, is suitable for culturing different kinds of mushrooms, and is capable of increase the yield and quality of mushrooms.

SUMMARY

In view of the foregoing, this disclosure is to provide a culture substrate that contains pasture grass as the main content, is suitable for culturing different kinds of mushrooms, and is capable of increase the yield and quality of mushrooms. Accordingly, the culture substrate of this disclosure has lower cost and does not cause the additional damage to the natural environment. In addition, this disclosure also provides a bulk bag containing the culture substrate and an incubating method of mushrooms utilizing the culture substrate.

To achieve the above, this disclosure provides a pasture grass substrate comprising a dry material and water, wherein the dry material comprises a pasture grass, a corncob and a rice bran, a weight ratio of the pasture grass in the dry material is from 55% to 75%, a weight ratio of the corncob in the dry material is from 20% to 30%, and a weight ratio of the rice bran in the dry material is from 5% to 15%.

In one embodiment, the pasture grass is pennisetum purpureum, Timothy grass, orchard grass, alpine grass, Crain grass, Pangola grass, Bermuda grass, oat grass, Nile grass, or alfalfa.

To achieve the above, this disclosure also provides a pasture grass plastic bag comprising the above-mentioned pasture grass substrate and a container, and the pasture grass substrate is contained in the container.

To achieve the above, this disclosure also provides an incubating method of mushrooms. Herein, the mushrooms comprise Brazil mushrooms, button mushrooms, straw mushrooms, shaggy mane (or shaggy ink cap), or Portabello mushrooms. The incubating method comprises the following steps of: a pre-step for performing a high-temperature and high-pressure sterilization with the above-mentioned pasture grass plastic bag and then cooling the pasture grass plastic bag to room temperature; an inoculation step for inoculating mushroom seeds of the mushrooms into the pasture grass plastic bag prepared by the pre-step in a sterile room by using a manual sterile operation; a culture step for placing the pasture grass plastic bag processed by the inoculation step into a sterile culture room for cultivation until mycelium in the pasture grass plastic bag are cultured to grow and mature; a casing step for removing the container of the pasture grass plastic bag after the culture step and then covering residuals by a casing soil layer; a first spawn running step for culturing the pasture grass plastic bag covered by the casing soil layer until more than or equal to 90% of mycelium are growing from the surface of the casing soil layer; a ruffling step for ruffling the casing soil layer after the first spawn running step, followed by mycelium recovery; a second spawn running step for adding water to the casing soil layer after the ruffling step, adjusting an ambient temperature to 15~30° C. and a humidity to 80~95%, and culturing for a period of time; and a harvesting step for harvesting the mushrooms growing from the casing soil layer.

In one embodiment, after the harvesting step, the incubating method further comprises a soil replenishing step for replenishing soil and water to the casing soil layer.

In one embodiment, the incubating method further comprises repeating the first spawn running step, the ruffling step, the second spawn running step and the harvesting step after the soil replenishing step.

In one embodiment, in the pre-step, the sterilization is performed with a high-temperature and high-pressure sterilization machine with a pressure of 1.0~1.5 kg/cm$^2$, a temperature of 115~125° C., and a sterilization time of 90~150 minutes.

In one embodiment, in the inoculation step, the ambient temperature is 20~25° C. and the pasture grass plastic bag is placed in a dark environment.

In one embodiment, the casing step includes to adjust a moisture content of the casing soil layer to 55-75%, adjust a pH value of the casing soil layer, and then place the casing soil layer to cover the pasture grass plastic bag.

In one embodiment, the casing soil layer comprises peat soil or laterite.

In one embodiment, in the casing step, the thickness of the casing soil layer is 3~5 cm.

In one embodiment, in the first spawn running step, the ambient temperature is 20~30° C., and the humidity is 80~95%.

To achieve the above, the present disclosure further provides an incubating method of mushrooms. Herein, the mushrooms comprise *phellinus linteus, cordyceps militaris, antrodia camphorate* (or *antrodia cinnamomea*), shiitake mushrooms, enoki mushrooms, trametes versicolor, wood ear mushrooms (or black ear fungus), oyster mushrooms, golden oyster mushrooms, king oyster mushrooms, shimeji mushrooms, abalone mushrooms, maitake mushrooms, brown swordbelts, lion's mane mushrooms, termite mushrooms, white shimeji mushrooms, nameko mushrooms, bamboo fungus, chanterelle mushrooms, or reishi mushrooms (or *ganoderma lucidum*). The incubating method comprises the following steps of: a pre-step for performing a high-temperature and high-pressure sterilization with the above-mentioned pasture grass plastic bag and then cooling the pasture grass plastic bag to room temperature; an inoculation step for inoculating mushroom seeds of the mushrooms into the pasture grass plastic bag prepared by the pre-step in a sterile room by using a manual sterile operation; a culture step for placing the pasture grass plastic bag processed by the inoculation step into a sterile culture room for cultivation until mycelium in the pasture grass plastic bag are cultured to grow and mature; and a harvesting step for harvesting the mushrooms growing from the pasture grass plastic bag.

In one embodiment, in the pre-step, the sterilization is performed with a high-temperature and high-pressure sterilization machine with a pressure of 1.0~1.5 kg/cm$^2$, a temperature of 115~125° C., and a sterilization time of 90~150 minutes.

In one embodiment, in the inoculation step, the ambient temperature is 20~25° C. and the pasture grass plastic bag is placed in a dark environment.

As mentioned above, the pasture grass substrate of this disclosure contains pasture grass as the main content, is suitable for culturing different kinds of mushrooms, and is capable of increase the yield and quality of mushrooms. Accordingly, the pasture grass substrate of this disclosure has lower cost and does not cause the additional damage to the natural environment. The pasture grass substrate and the incubating method of mushrooms of this disclosure can provide a great benefit to the mushroom industry. In addition, the pasture grass plastic bag of this disclosure can be recycled. For example, it can not only be used as a feed source for animal husbandry, but also be used as organic compost, thereby increasing the yield of mushrooms and contributing to the sustainable development of ecology.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Ranges: throughout this disclosure, various embodiments may be presented in ranges. It should be understood that the descriptions in ranges are merely for convenience and brevity and should not be construed as limiting the scope of the invention. Accordingly, the descriptions in ranges should be considered to specifically disclose all possible subranges as well as individual numerical values within said range. For example, a description of a range from 1 to 6 should be considered to have specific disclosed subranges, such as from 1 to 3, from 1 to 4, from 1 to 5, from 2 to 4, from 2 to 6, from 3 to 6, etc., and any single or partial numbers within the range, such as 1, 2, 2.7, 3, 4, 5, 5.3, and 6. The foregoing rules apply regardless of the span of the scope.

In one embodiment, a pasture grass substrate includes a dry material and water. The dry material includes a pasture grass, a corncob and a rice bran. The weight ratio of the pasture grass in the dry material is from 55% to 75%, the weight ratio of the corncob in the dry material is from 20% to 30%, and the weight ratio of the rice bran in the dry material is from 5% to 15%.

In this embodiment, the weight ratio of the pasture grass in the dry material is from 55% to 75%. Preferably, the weight ratio of the pasture grass in the dry material can be, for example, 55%, 56%, 57%, 58%, 59%, 60%, 61%, 62%, 63%, 64%, 65%, 66%, 67%, 68%, 69%, 70%, 71%, 72%, 73%, 74%, 75%, or any value or range between any two of the aforesaid percentage values.

In this embodiment, the weight ratio of the corncob in the dry material is from 20% to 30%. Preferably, the weight ratio of the corncob in the dry material can be, for example, 20%, 21%, 22%, 23%, 24%, 25%, 26%, 27%, 28%, 29%, 30%, or any value or range between any two of the aforesaid percentage values.

In this embodiment, the weight ratio of the rice bran in the dry material is from 5% to 15%. Preferably, the weight ratio of the rice bran in the dry material can be, for example, 5%, 6%, 7%, 8%, 9%, 10%, 11%, 12%, 13%, 14%, 15%, or any value or range between any two of the aforesaid percentage values.

In this embodiment, the pasture grass is pennisetum purpureum, Timothy grass, orchard grass, alpine grass, Crain grass, Pangola grass, Bermuda grass, oat grass, Nile grass, or alfalfa. For example, the pasture grass can be at least one of pennisetum purpureum, Timothy grass, orchard grass, alpine grass, Crain grass, Pangola grass, Bermuda grass, oat grass, Nile grass, and alfalfa, or any combination thereof.

Figure 1:
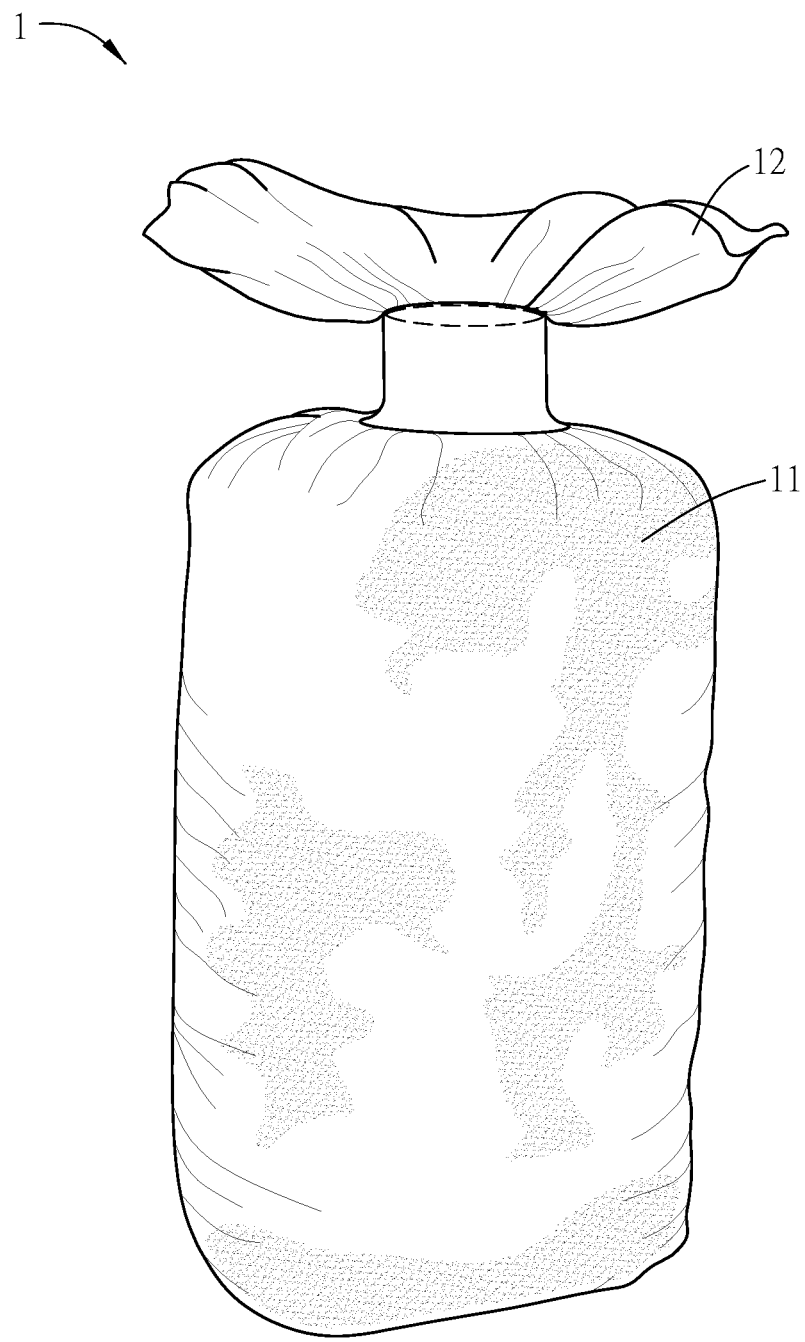
FIG. 1 is a schematic diagram showing a pasture grass plastic bag according to an embodiment of this disclosure.

FIG. 1 is a schematic diagram showing a pasture grass plastic bag 1 according to an embodiment of this disclosure. As shown in FIG. 1, the pasture grass plastic bag 1 of this embodiment includes a pasture grass substrate 11 (as mentioned above) and a container 12. The pasture grass substrate 11 is contained in the container 12. For example, the container 12 can be a plastic bag (e.g. polypropylene bag), a plastic film, a plastic tub, an aluminum foil bag, a tin can, an aluminum can, a porcelain, or any of other containers known to those of ordinary skill in the art can be used to contain the culture substrate. The pasture grass substrate 11 can be packed or filled in the container 12 by any means known to those of ordinary skill in the art so as to fabricate the pasture grass plastic bag 1.

Figure 2A:
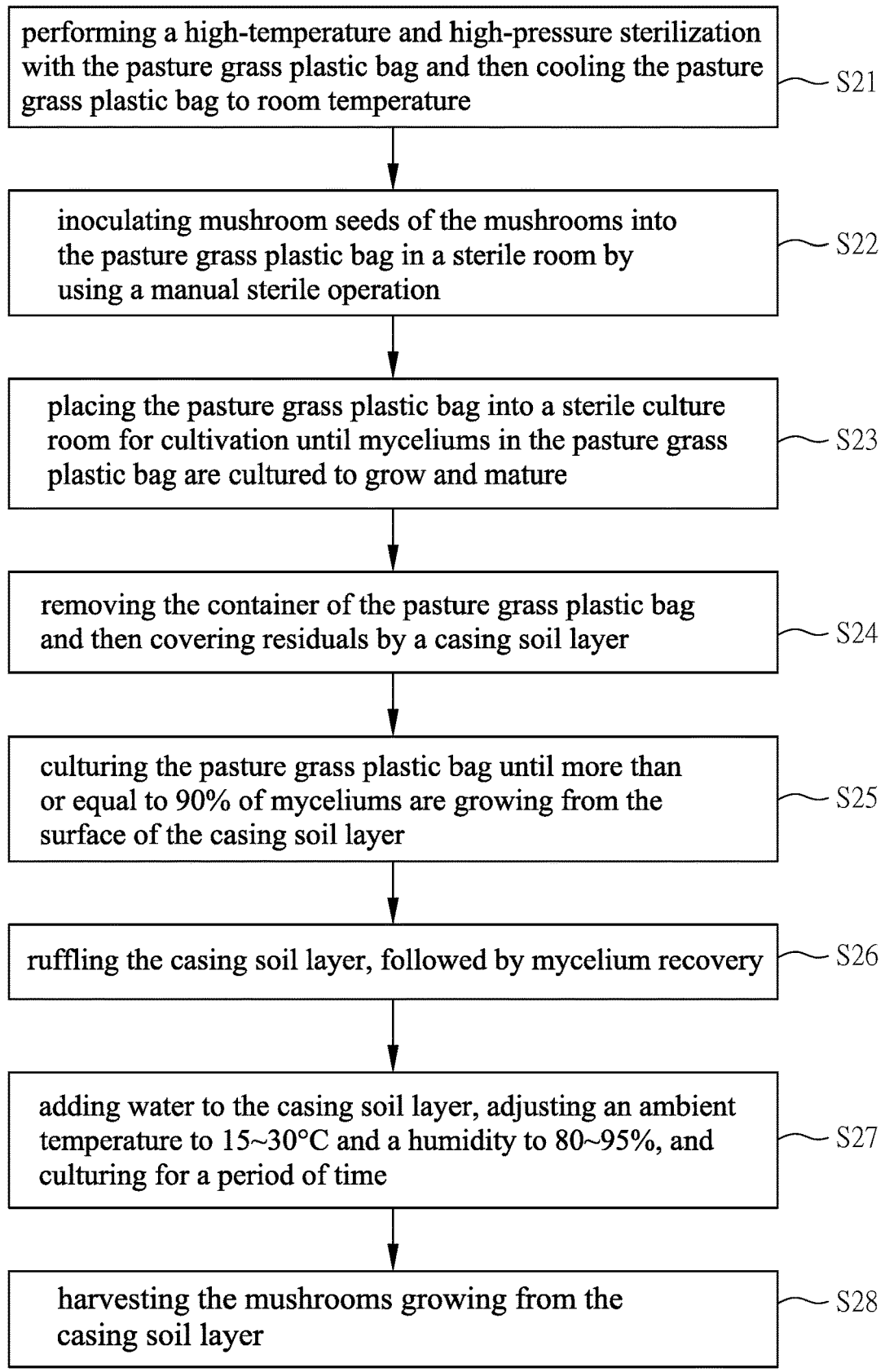
FIG. 2A is a flow chart of an incubating method of mushrooms according to an embodiment of this disclosure.

FIG. 2A is a flow chart of an incubating method of mushrooms according to an embodiment of this disclosure. As shown in FIG. 2A, the incubating method of mushrooms includes a pre-set step (step S21), an inoculation step (step S22), a culture step (step S23), a casing step (step S24), a first spawn running step (step S25), a ruffling step (step S26), a second spawn running step (step S27), and a harvesting step (step S28). For example, the incubating method of mushrooms of this embodiment can be used to incubate Brazil mushrooms, button mushrooms, straw mushrooms, shaggy mane (or shaggy ink cap), or Portabello mushrooms.

In the pre-set step (step S21), the above-mentioned pasture grass plastic bag is subjected to a high-temperature and high-pressure sterilization and then cooled to room temperature. For example, the sterilization process of the pasture grass plastic bag can be performed by a high-temperature and high-pressure sterilization machine with a pressure of 1.0~1.5 kg/cm$^2$, a temperature of 115~125° C., and a sterilization time of 901~50 minutes. Preferably, the pressure can be 1.0 kg/cm$^2$, 1.1 kg/cm$^2$, 1.2 kg/cm$^2$, 1.3 kg/cm$^2$, 1.4 kg/cm$^2$, 1.5 kg/cm$^2$, or any value or range between any two of the aforesaid pressure values. The temperature can be 115° C., 116° C., 117° C., 118° C., 119° C., 120° C., 121° C., 122° C., 123° C., 124° C., 125° C., or any value or range between any two of the aforesaid temperature values. The sterilization time can be 90 minutes, 100 minutes, 110 minutes, 120 minutes, 130 minutes, 140 minutes, 150 minutes, or any value or range between any two of the aforesaid time values.

The inoculation step (step S22) is to inoculate mushroom seeds of the mushrooms into the pasture grass plastic bag prepared by the pre-step (step S21) in a sterile room by using a manual sterile operation.

The culture step (step S23) is to place the pasture grass plastic bag processed by the inoculation step (step S22) into a sterile culture room for cultivation until mycelium in the pasture grass plastic bag are cultured to grow and mature. For example, in this culture step, the ambient temperature is 20~25° C. and the pasture grass plastic bag is placed in a dark environment. Preferably, the ambient temperature can be 20° C., 21° C., 22° C., 23° C., 24° C., 25° C., or any value or range between any two of the aforesaid temperature values.

The casing step (step S24) is to remove the container of the pasture grass plastic bag after the culture step (step S23) and then to cover the residual(s) by a casing soil layer. Specifically, the casing step includes to adjust a moisture content of the casing soil layer to 55-75%, adjust a pH value of the casing soil layer, and then place the casing soil layer to cover the pasture grass plastic bag. Preferably, the moisture content of the casing soil layer can be 55%, 56%, 57%, 58%, 59%, 60%, 61%, 62%, 63%, 64%, 65%, 66%, 67%, 68%, 69%, 70%, 71%, 72%, 73%, 74%, 75%, or any value or range between any two of the aforesaid percentage values. In addition, the pH value of the casing soil layer can be adjusted to pH7~pH8. Preferably, the pH value of the casing soil layer can be adjusted to pH7.0, pH7.1, pH7.2, pH7.3, pH7.4, pH7.5, pH7.6, pH7.7, pH7.8, pH7.9, pH8.0, or any value or range between any two of the aforesaid pH values. Preferably, the casing soil layer may comprise peat soil or laterite. The thickness of the casing soil layer is 3~5 cm. Preferably, the thickness of the casing soil layer can be 3 cm, 4 cm, 5 cm, or any value or range between any two of the aforesaid thickness values.

The first spawn running step (step S25) is to culture the pasture grass plastic bag covered by the casing soil layer (after step S24) until more than or equal to 90% of mycelium are growing from the surface of the casing soil layer. For example, the first spawn running step can last for about two months until 90%, 91%, 92%, 93%, 94%, 95%, 96%, 97%, 98%, 99%, or 100% of mycelium are growing from the surface of the casing soil layer. In the first spawn running step (step S25), for example, the ambient temperature is 20~30° C., and the humidity is 80~95%. Preferably, the ambient temperature can be 20° C., 21° C., 22° C., 23° C., 24° C., 25° C., 26° C., 27° C., 28° C., 29° C., 30° C., or any value or range between any two of the aforesaid temperature values. Preferably, the humidity can be 80%, 81%, 82%, 83%, 84%, 85%, 86%, 87%, 88%, 89%, 90%, 91%, 92%, 93%, 94%, 95%, or any value or range between any two of the aforesaid percentage values.

The ruffling step (step S26) is to ruffle the casing soil layer after the first spawn running step (step S25), followed by mycelium recovery. The ruffling step can be performed by any ruffling method known by those of the skilled person in the art.

The second spawn running step (step S27) is to add water to the casing soil layer after the ruffling step (step S26), adjust the ambient temperature to 15~30° C. and the humidity to 80~95%, and culture for a period of time. Preferably, the ambient temperature can be 15° C., 16° C., 17° C., 18° C., 19° C., 20° C., 21° C., 22° C., 23° C., 24° C., 25° C., 26° C., 27° C., 28° C., 29° C., 30° C., or any value or range between any two of the aforesaid temperature values, and the humidity can be 80%, 81%, 82%, 83%, 84%, 85%, 86%, 87%, 88%, 89%, 90%, 91%, 92%, 93%, 94%, 95%, or any value or range between any two of the aforesaid percentage values. More preferably, the ambient temperature is adjusted to 22° C., and the humidity is adjusted to 90%.

The harvesting step (step S28) is to harvest the mushrooms growing from the casing soil layer. After finishing the above-mentioned steps, the first harvest procedure is completed, and the following periodic mushroom cultivation (multiple harvests) is possible, which will be described hereinafter.

Figure 2B:
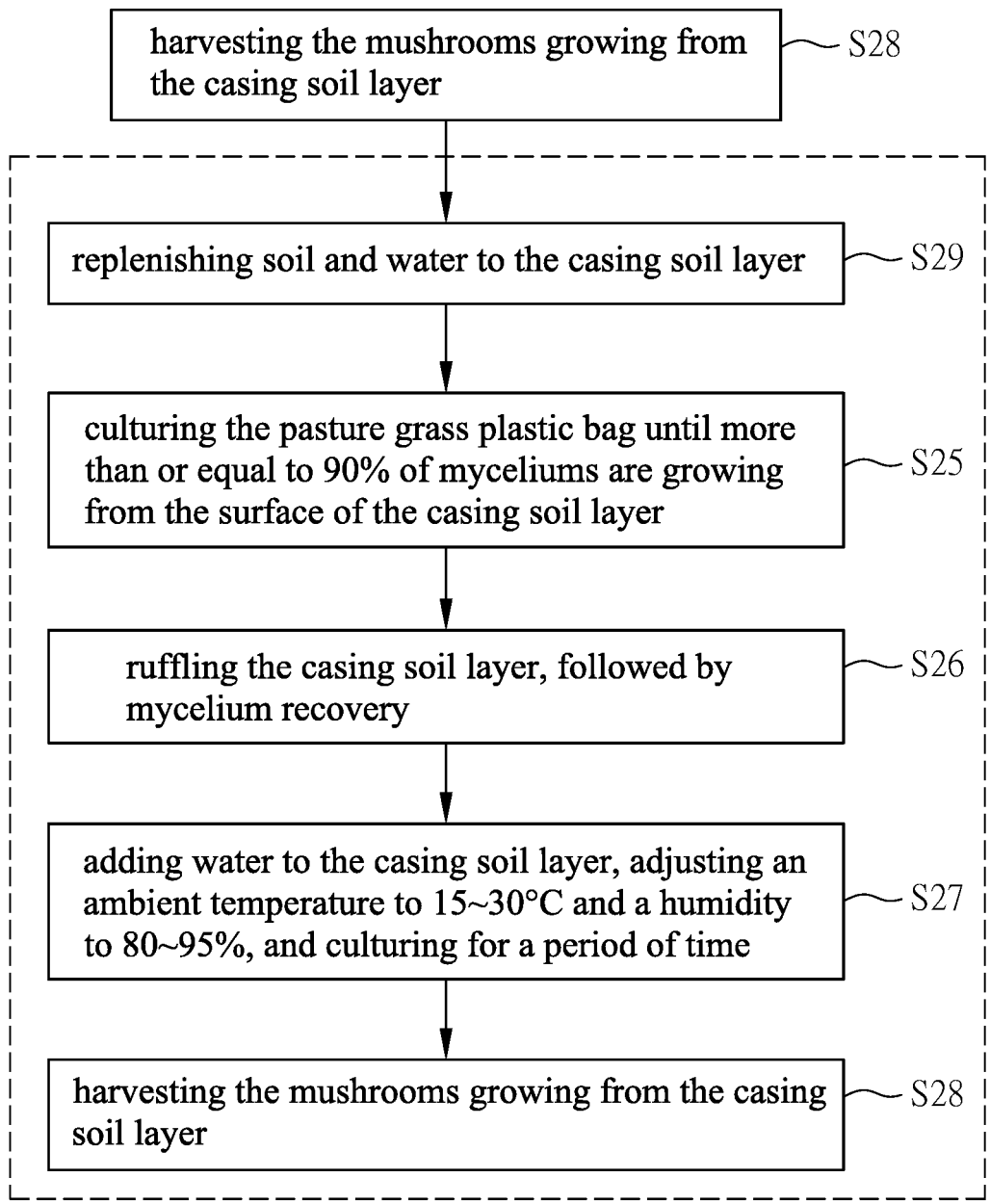
FIG. 2B is a flow chart showing the process of periodic mushroom cultivation after the incubating method of mushrooms of FIG. 2A.

FIG. 2B is a flow chart showing the process of periodic mushroom cultivation after the incubating method of mushrooms of FIG. 2A. In this embodiment, after finishing the above-mentioned steps (the first harvest procedure), the pasture grass plastic bag can be subjected to the following periodic mushroom cultivation (multiple harvests). For example, after the harvesting step (step S28), the incubating method can further include a soil replenishing step (step S29) for replenishing soil and water to the casing soil layer until the thickness of the casing soil layer reaching 3~5 cm and the moisture content of the casing soil layer reaching 55~75%. Preferably, the thickness of the casing soil layer can be 3 cm, 4 cm, 5 cm, or any value or range between any two of the aforesaid thickness values. Preferably, the moisture content of the casing soil layer can be 55%, 56%, 57%, 58%, 59%, 60%, 61%, 62%, 63%, 64%, 65%, 66%, 67%, 68%, 69%, 70%, 71%, 72%, 73%, 74%, 75%, or any value or range between any two of the aforesaid percentage values.

In the dotted-line block of FIG. 2B, the first spawn running step (step S25), the ruffling step (step S26), the second spawn running step (step S27), and the harvesting step (step S28) can be repeated after the soil replenishing step (step S29) so as to perform a second mushroom cultivation process. Similarly, after the second mushroom cultivation process, the soil replenishing step (step S29), the first spawn running step (step S25), the ruffling step (step S26), the second spawn running step (step S27), and the harvesting step (step S28) can be repeated again so as to perform a third mushroom cultivation process. In other words, the steps shown in the dotted-line block (including steps S29, S25, S26, S27 and S28) can be continuously repeated to achieve periodic mushroom cultivation. This periodic mushroom cultivation can increase the utility rate of the cultivation materials to reduce the cultivation cost and improve the yield of mushrooms.

Figure 3:
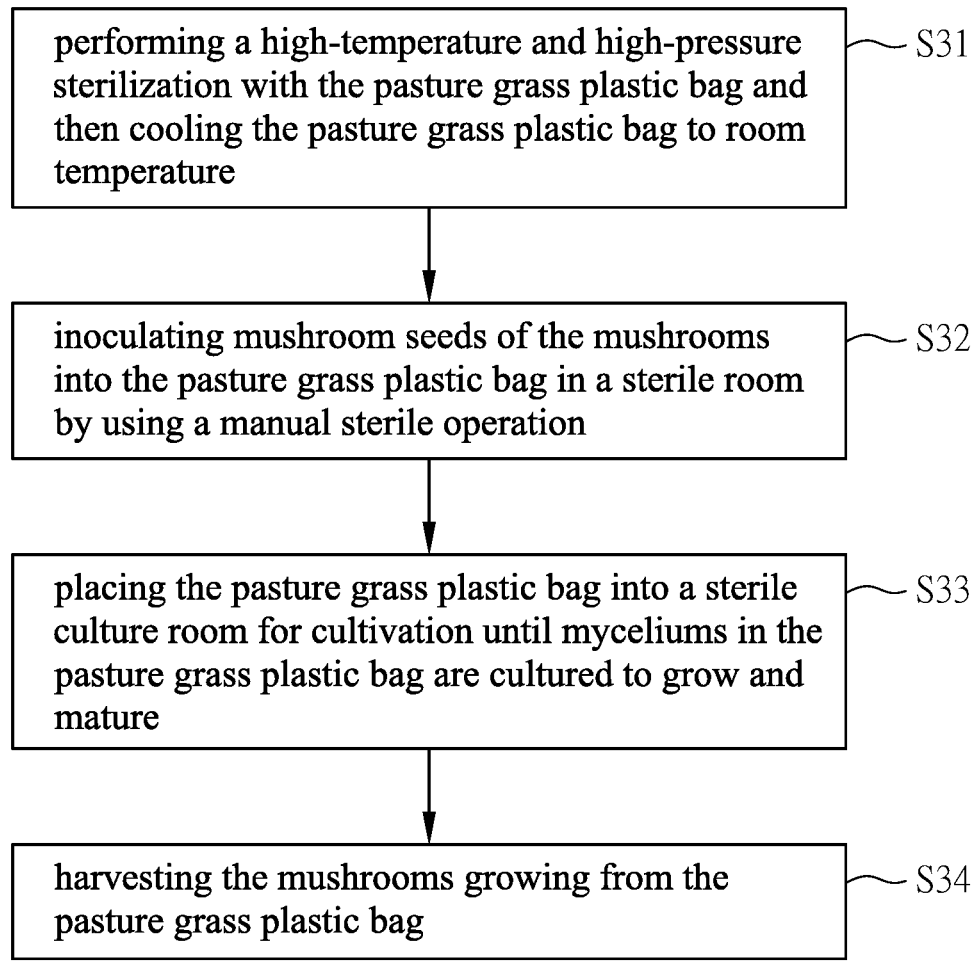
FIG. 3 is a flow chart of an incubating method of mushrooms according to another embodiment of this disclosure.

FIG. 3 is a flow chart of an incubating method of mushrooms according to another embodiment of this disclosure. As shown in FIG. 3, the incubating method of mushrooms of this embodiment is mostly the same as that of the previous embodiment. Unlike the incubating method of mushrooms of the previous embodiment, the incubating method of mushrooms of this embodiment does not include the casing step, the spawn running steps and the ruffling step. That is, the incubating method of mushrooms of this embodiment can incubate the mushrooms without the casing step. In this embodiment, the incubating method of mushrooms includes a pre-set step (step S31), an inoculation step (step S32), a culture step (step S33), and a harvesting step (step S34). For example, the incubating method of mushrooms of this embodiment can be used to incubate phellinus linteus, cordyceps militaris, antrodia camphorate (or antrodia cinnamomea), shiitake mushrooms, enoki mushrooms, trametes versicolor, wood ear mushrooms (or black ear fungus), oyster mushrooms, golden oyster mushrooms, king oyster mushrooms, shimeji mushrooms, abalone mushrooms, maitake mushrooms, brown swordbelts, lion's mane mushrooms, termite mushrooms, white shimeji mushrooms, nameko mushrooms, bamboo fungus, chanterelle mushrooms, or reishi mushrooms (or ganoderma lucidum).

In the pre-set step (step S31), the above-mentioned pasture grass plastic bag is subjected to a high-temperature and high-pressure sterilization and then cooled to room temperature. For example, the sterilization process of the pasture grass plastic bag can be performed by a high-temperature and high-pressure sterilization machine with a pressure of 1.0~1.5 kg/cm$^2$, a temperature of 115~125° C., and a sterilization time of 90~150 minutes. Preferably, the pressure can be 1.0 kg/cm$^2$, 1.1 kg/cm$^2$, 1.2 kg/cm$^2$, 1.3 kg/cm$^2$, 1.4 kg/cm$^2$, 1.5 kg/cm$^2$, or any value or range between any two of the aforesaid pressure values. The temperature can be 115° C., 116° C., 117° C., 118° C., 119° C., 120° C., 121° C., 122° C., 123° C., 124° C., 125° C., or any value or range between any two of the aforesaid temperature values. The sterilization time can be 90 minutes, 100 minutes, 110 minutes, 120 minutes, 130 minutes, 140 minutes, 150 minutes, or any value or range between any two of the aforesaid time values.

The inoculation step (step S32) is to inoculate mushroom seeds of the mushrooms into the pasture grass plastic bag prepared by the pre-step (step S31) in a sterile room by using a manual sterile operation.

The culture step (step S33) is to place the pasture grass plastic bag processed by the inoculation step (step S32) into a sterile culture room for cultivation until mycelium in the pasture grass plastic bag are cultured to grow and mature. For example, in this culture step, the ambient temperature is 20~25° C. and the pasture grass plastic bag is placed in a dark environment. Preferably, the ambient temperature can be 20° C., 21° C., 22° C., 23° C., 24° C., 25° C., or any value or range between any two of the aforesaid temperature values.

The harvesting step (step S34) is to harvest the mushrooms growing from the pasture grass plastic bag.

In summary, the pasture grass substrate of this disclosure contains pasture grass as the main content, is suitable for culturing different kinds of mushrooms, and is capable of increase the yield and quality of mushrooms. Accordingly, the pasture grass substrate of this disclosure has lower cost and does not cause the additional damage to the natural environment. The pasture grass substrate and the incubating method of mushrooms of this disclosure can provide a great benefit to the mushroom industry. In addition, the pasture grass plastic bag of this disclosure can be recycled. For example, it can not only be used as a feed source for animal husbandry, but also be used as organic compost, thereby increasing the yield of mushrooms and contributing to the sustainable development of ecology.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A pasture grass substrate comprising a dry material and water, excluding sawdust, wherein the dry material consists of a pasture grass, a corncob and a rice bran, a weight ratio of the pasture grass in the dry material is from 55% to 75%, a weight ratio of the corncob in the dry material is from 20% to 30%, and a weight ratio of the rice bran in the dry material is from 5% to 15%, wherein the pasture grass is pennisetum purpureum, Timothy grass, orchard grass, alpine grass, Crain grass, Pangola grass, Bermuda grass, oat grass, or Nile grass.

2. The pasture grass substrate of claim 1, wherein the pasture grass substrate is contained in a container.

3. The pasture grass substrate of claim 2, wherein the container is a plastic bag, a plastic film, a plastic tub, an aluminum foil bag, a tin can, an aluminum can or a porcelain.

* * * * *